(12) United States Patent
Strigel et al.

(10) Patent No.: US 11,068,729 B2
(45) Date of Patent: Jul. 20, 2021

(54) APPARATUS AND METHOD FOR DETECTING A TRAFFIC LIGHT PHASE FOR A MOTOR VEHICLE

(71) Applicant: Conti Temic microelectronic GmbH, Nuremberg (DE)

(72) Inventors: Elias Strigel, Wangen (DE); Stefan Heinrich, Achern (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 83 days.

(21) Appl. No.: 16/481,946

(22) PCT Filed: Feb. 27, 2018

(86) PCT No.: PCT/DE2018/200018
§ 371 (c)(1),
(2) Date: Jul. 30, 2019

(87) PCT Pub. No.: WO2018/157893
PCT Pub. Date: Sep. 7, 2018

(65) Prior Publication Data
US 2020/0042808 A1    Feb. 6, 2020

(30) Foreign Application Priority Data

Feb. 28, 2017   (DE) ..................... 10 2017 203 236.7

(51) Int. Cl.
*G06K 9/00*     (2006.01)
*G06T 7/11*     (2017.01)
*G06T 7/90*     (2017.01)

(52) U.S. Cl.
CPC ............ *G06K 9/00825* (2013.01); *G06T 7/11* (2017.01); *G06T 7/90* (2017.01); *G06T 2207/10024* (2013.01)

(58) Field of Classification Search
CPC ....... G06T 7/11; G06T 7/90; G08G 1/096716; G08K 9/00825; G06K 9/00825
See application file for complete search history.

(56) References Cited

U.S. PATENT DOCUMENTS 10,217,244 B2    2/2019  Kowalczyk et al.
2009/0303077 A1*  12/2009  Onome ............ G08G 1/096716
                                                   340/901
(Continued)

FOREIGN PATENT DOCUMENTS

DE    102006060612    6/2008
DE    102015003847    8/2015
(Continued)

OTHER PUBLICATIONS

English translation of the International Search Report of the International Searching Authority for International Application PCT/DE2018/200018, dated Jun. 6, 2018, 3 pages, European Patent Office, HV Rijswijk, Netherlands.
(Continued)

*Primary Examiner* — Myron Wyche
(74) *Attorney, Agent, or Firm* — W. F. Fasse

(57) ABSTRACT

An apparatus for detecting a traffic light phase for a motor vehicle, includes: an image sensor device (10), configured to capture an image of a traffic light and to provide the image as image data; a segmentation device (20) configured to define at least one partial region of the captured image and to assign it to at least one signal lamp of the traffic light; a scaling device (30), configured to determine a maximum color saturation and/or a maximum brightness in the at least one partial region; and a computer device (40) configured to determine a signal status of the traffic light based on the maximum color saturation and/or the maximum brightness.

19 Claims, 2 Drawing Sheets

(56) References Cited

U.S. PATENT DOCUMENTS

2013/0253754 A1\* 9/2013 Ferguson ............ G05D 1/0231
701/28
2018/0060660 A1\* 3/2018 Sun ......................... G01C 3/06

FOREIGN PATENT DOCUMENTS

DE 102014220077 4/2016
WO WO 2007/102065 9/2007

OTHER PUBLICATIONS

PCT International Preliminary Report on Patentability including English Translation of PCT Written Opinion of the International Searching Authority for International Application PCT/DE2018/200018, dated Sep. 3, 2019, 8 pages, International Bureau of WIPO, Geneva, Switzerland.

German Search Report for German Patent Application No. 10 2017 203 236.7, dated Jan. 16, 2018, 9 pages, German Patent and Trademark Office, Muenchen, Germany, with partial English translation, 7 pages.

Jesse Levinson et al., "Traffic Light Mapping, Localization, and State Detection for Autonomous Vehicles", IEEE International Conference on Robotics and Automation (ICRA 2011), May 1, 2011, XP055478036, ISBN: 978-1-61284-386-5, pp. 5784 to 5791.

Keisuke Yoneda et al., "Simultaneous State Recognition for Multiple Traffic Signals on Urban Road", 11th France-Japan & $9^{th}$ Europe-Asia Congress on Mechatronics (Mecatronics) /17th International Conference on Research and Education in Mechatronics (REM), IEEE, Jun. 15, 2016, XP032946568, pp. 135 to 140.

\* cited by examiner

APPARATUS AND METHOD FOR DETECTING A TRAFFIC LIGHT PHASE FOR A MOTOR VEHICLE

TITLE OF THE INVENTION

TECHNICAL FIELD

The present invention relates to image acquisition and image processing systems in motor vehicles.

In particular, the present invention relates to an apparatus and a method for detecting a traffic light phase by camera for a motor vehicle.

TECHNICAL BACKGROUND

The publication DE 102015003847 A1 describes a method for acquiring light signals from at least one light signaling device of a modulated light signal installation and for signaling the light signals to a driver of a vehicle. The following steps are provided for this purpose:

1. a visual acquisition of a region of the surroundings in front of the vehicle by means of at least one vehicle-mounted image acquisition device;
2. an evaluation of the image data acquired by the at least one vehicle-mounted image acquisition device by an image evaluation device, which evaluates the acquired image data for the presence of a red-light signal of at least one light signaling device of a modulated light signal installation;
3. displaying the red-light signal of at least one light signaling device identified in the evaluated image data by means of a vehicle-mounted display device.

Regarding step 2, it is explained in the publication: "Such image evaluation devices and methods for evaluating images are likewise known from the prior art so there is no need to go into more detail about these here".

However, the process of establishing the currently switched traffic light phase, for instance red, amber, green, of a previously detected traffic light, by means of computerized visual image recognition methods in the field of road traffic hazard and situation recognition, is made difficult by the following factors:

i) occurrence of glare or overexposure of the captured image;

ii) reflections on the traffic light glass (i.e. the glass cover or lens of a lamp of the traffic light) in the captured image, of light that does not originate from the traffic light, for instance caused by extraneous light;

iii) poor contrast during the capturing of the image, for instance during imaging of the traffic light with a light background (sky) directly at the stop line in front of an overhead traffic light;

iv) steep angle of vision, for instance during imaging of the traffic light likewise directly at the stop line in front of an overhead traffic light; or v) partial masking of the region of the red, green or amber light by the lampshade of the traffic light, for instance during lateral capturing, for instance of a traffic light located on the right side of the road when stopping directly at the stop line.

SUMMARY OF THE INVENTION

It is an object of the present invention to provide an improved visual image recognition for traffic light phases of traffic light systems.

This object can be achieved by an apparatus, a motor vehicle and a method according to aspects of the invention as set forth herein.

A first aspect of the present invention relates to an apparatus for detecting a traffic light phase for a motor vehicle.

The apparatus comprises an image sensor device, which is designed to capture an image of a traffic light and to provide same in the form of image data.

The apparatus further comprises a segmentation device, which is designed to define at least one partial region of the captured image and to assign same to at least one signal lamp of the plurality of signal lamps of the traffic light.

The apparatus further comprises a scaling device, which is designed to determine a maximum color saturation and/or a maximum brightness in the at least one partial region. In particular, this means the maximum color saturation or respectively brightness of a subregion consisting of a pixel or a small connected pixel region in the partial region.

The apparatus further comprises a computer device, which is designed to establish a signal status, i.e. determine a traffic light phase, of the traffic light on the basis of the determined maximum color saturation and/or the determined maximum brightness.

In other words, the present invention advantageously makes it possible to guarantee a recognition of traffic lights and their respective traffic light phases.

The present invention also advantageously makes it possible to ensure that an overhead traffic light is recognized from a vehicle directly at the stop line—i.e. with an unfavorable, steep viewing angle of the traffic light—with a wide-angle lens.

According to a preferred embodiment, the segmentation device is designed to define a partial region of the captured image for each signal lamp, meaning each traffic light color, of a detected traffic light and to assign or allocate the partial region of the captured image to the (respective) signal lamp. The scaling device is preferably designed to determine maximum and mean color saturation and/or maximum and mean brightness for each of the partial regions. The computer device is preferably designed to establish the signal status, i.e. determine the traffic light phase, of the traffic light from a comparison of maximum to mean color saturation (or respectively brightness) for all partial regions of a traffic light.

In other words, a center or subregion having maximum brightness and/or color saturation is sought, i.e. searched for, in each signal lamp (separated into red, amber, i.e. yellow, and green) and is compared with the brightness in the remaining region of the respective signal lamp. The traffic light phase is calculated or computed from the ratio of the maximum value and the average or mean value in the region of the respective signal lamp.

Using "just the simple brightness" of the respective signal lamps for recognition would not be sufficient to be able to determine the traffic light phase in most cases in which signal lamps are merely reflecting brightly, e.g. due to extraneous light.

In an advantageous embodiment of the present invention, it is provided that the computer device is designed to establish the signal status of the traffic light on the basis of i) contrast values of the captured image;

ii) prevailing light conditions during the capturing of the image; or iii) performance parameters of the camera used with the aid of
i) the determined maximum color saturation alone;
ii) the determined maximum brightness alone; or
iii) both the determined maximum color saturation and the determined maximum brightness.

In an advantageous embodiment of the present invention, it is provided that the scaling device is designed to determine the maximum color saturation and the maximum brightness in the at least one partial region on the basis of an evaluation of the HSV color space of the image. The evaluation of the HSV color space can also be restricted to the partial region.

In an advantageous embodiment of the present invention, it is provided that the segmentation device is designed to assign the partial region of the captured image to the respective associated signal lamp of the traffic light on the basis of a visual or optical image recognition of signal light glasses (i.e. glass covers or lenses) of the signal lamps of the traffic light.

In an advantageous embodiment of the present invention, it is provided that the image sensor device comprises a wide-angle lens.

The term "wide-angle lens" as used in the present application refers to a lens having an angle of view which is larger than that of normal lenses, for example an angle of view which is larger than 40° or larger than 50° or larger than 60°.

In an advantageous embodiment of the present invention, it is provided that the image sensor device has an upwardly pointing viewing direction and is designed to capture an image of an overhead traffic light. This advantageously makes it possible to compensate for steep viewing angles and the resulting reduced contrast quality of the captured image.

The described configurations and further developments can be combined in any way with one another.

Further possible configurations, further developments and implementations of the present invention also comprise combinations of features of the present invention, which are described above or below with respect to the embodiments, including those which are not explicitly indicated.

The appended drawings are intended to provide a further understanding of the embodiments of the present invention.

The appended drawings illustrate embodiments and, in connection with the description, serve to explain concepts of the present invention.

Other embodiments and many of the indicated advantages are set out with respect to the figures of the drawings. The represented elements of the figures of the drawings are not necessarily shown to scale with respect to one another.

DETAILED DESCRIPTION OF EXEMPLARY EMBODIMENTS

Figure 1:
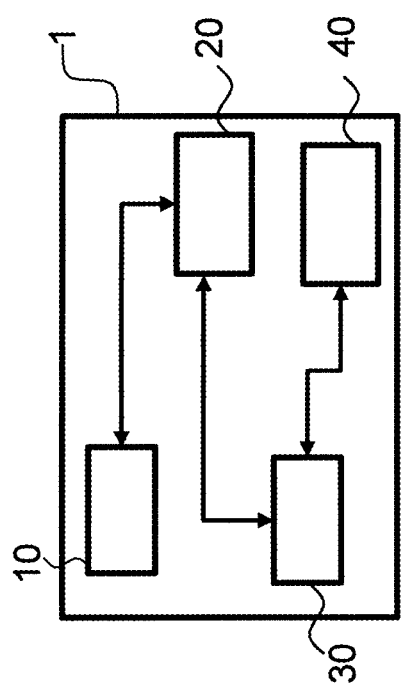
FIG. 1: shows a schematic representation of an apparatus for detecting a traffic light phase for each camera for a motor vehicle according to an exemplary embodiment of the present invention.

In the figures of the drawings, the same reference numerals denote elements, parts or components or method steps which are the same or which have the same function, unless otherwise indicated.

The motor vehicle or respectively vehicle is, for example, a motor vehicle or a hybrid vehicle, for example a hybrid vehicle having a coasting function, for example a motorcycle, a bus or a truck or a bicycle.

A signal generator of an optical signaling system in road traffic is designated as the traffic light or traffic light signals by the present invention.

These visual signal generators in the form of light signals are various road signs which each have different meanings depending on their shape and color and only operate against the direction of travel of the traffic which is to be regulated.

Driver assistance systems require an evaluation of the respective statuses of the traffic lights or respectively traffic light systems, i.e. assessment of the traffic light phase, generally by means of visual image recognition and processing.

The term "HSV color space" as used by the present invention designates a color space on the basis of a color model, in which the color is defined on the basis of a color value, "hue", the color saturation, "saturation", and the brightness value, "value".

In an embodiment of the present invention, an HSL color space having relative lightness, "lightness", or an HSB color space having absolute brightness, "brightness", or an HSI color space having light intensity, "intensity", can also be used.

FIG. 1 shows a schematic representation of an apparatus for detecting a traffic light phase for a motor vehicle according to an exemplary embodiment of the present invention.

The apparatus 1 comprises an image sensor device 10, a segmentation device 20, a scaling device 30, and a computer device 40.

The image sensor device 10 is designed to capture an image of a traffic light and to provide same in the form of image data.

The segmentation device 20 is designed to define a partial region of the captured image and to assign same to at least one signal lamp of the plurality of signal lamps of the traffic light.

The scaling device 30 is designed to determine a maximum color saturation and/or a maximum brightness in the partial region.

The computer device 40 is designed to establish a signal status of the traffic light on the basis of the determined maximum color saturation and/or the determined maximum brightness.

Figure 2:
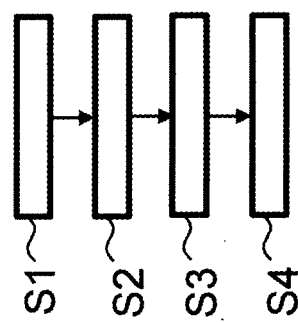
FIG. 2: shows a schematic representation of a flow chart of a method for detecting a traffic light phase for each camera for a motor vehicle according to another exemplary embodiment of the present invention.

FIG. 2 shows a schematic representation of a flow chart of a method for detecting a traffic light phase for each camera for a motor vehicle according to another exemplary embodiment of the present invention.

The method for detecting a traffic light phase for each camera for a motor vehicle comprises the following method steps:

A first method step involves capturing S1 an image of a traffic light by means of an image sensor device 10 and providing the image in the form of image data. The image data is, for example, binary coded data in an electronic form for reproducing image information.

A second method step involves defining S2, also segmenting, at least one partial region of the captured image by means of a segmentation device 20 and assigning the at least one partial region to at least one signal lamp of the traffic light by means of the segmentation device 20.

A third method step involves determining S3 a maximum color saturation and/or a maximum brightness in the at least one partial region by means of a scaling device 30.

A fourth method step involves establishing S4 a signal status of the traffic light on the basis of the determined maximum color saturation and/or the determined maximum brightness by means of a computer device 40.

Figure 3:
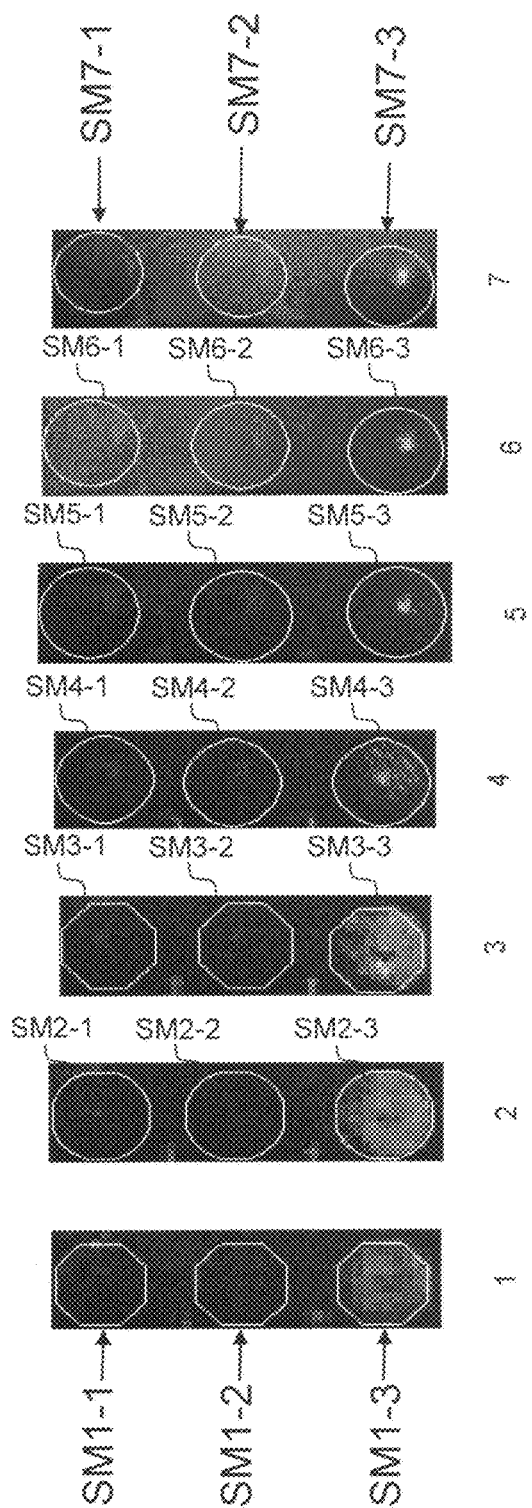
FIG. 3: shows a schematic representation of a segmented overhead traffic light according to another exemplary embodiment of the present invention.

FIG. 3 shows a schematic representation of a selection of segmented overhead traffic lights on the basis of images of traffic lights captured with an image sensor device in order to explain the invention.

A segmentation was performed for the seven traffic lights represented, i.e. partial regions SM1-1, . . . , SM7-3 of the captured image were defined, for example, by the segmentation device 20 and assigned to the signal lamps, i.e. red (e.g. SM1-1, SM2-1, . . . , SM7-1), amber (SM1-2, . . . , SM7-2), green (SM1-3, . . . , SM7-3), of the traffic light.

The traffic lights represented in FIG. 3 are, for example, segmented overhead traffic lights at a decreasing distance and increasing viewing angle, wherein the viewing angle increases from 1 to 7.

The circles show the partial regions SM1-1, . . . , SM7-3, within which the scaling device 30 determines a maximum and an average color saturation and a maximum and an average brightness in each case, the maximum brightness being more or less constant even as the viewing angle increases, unlike the total brightness of the partial region SM1-1, . . . , SM7-3, from left to right, i.e. from 1 to 7. In the case of the first five traffic lights represented (SM1- . . . , . . . , SM5- . . . ), the lowest partial region (SM1-3, . . . , SM5-3) shows, in each case, the highest mean color saturation and the highest mean brightness (compared with the two upper partial regions) . On the other hand, the sixth traffic light (SM6- . . . ) shows the highest mean color saturation and the highest mean brightness in the upper partial region (SM6-1). A traffic light recognition in accordance with the prior art would therefore reach the conclusion that the traffic light is showing a red signal.

On the other hand, the maximum color saturation and brightness is also at its highest in the lowest partial region (SM6-3) in the case of the sixth traffic light. In the case of the seventh traffic light (SM7-. . . ) the mean color saturation and brightness is, on the other hand, at its highest in the middle partial region (SM7-2). Here, a traffic light recognition in accordance with the prior art would reach the conclusion that the traffic light is showing an amber signal.

On the other hand, the maximum color saturation and brightness is also at its highest here, in the case of the seventh traffic light, in the lowest partial region (SM7-3). It can therefore always be correctly recognized that all seven traffic lights are showing a green signal with the apparatus described.

In a particularly preferred embodiment, it is possible to determine even more clearly which traffic light signal a segmented traffic light is showing by forming ratios of the maximum to average brightness or respectively color saturation: it is the one with the highest ratio value.

Figure 4:
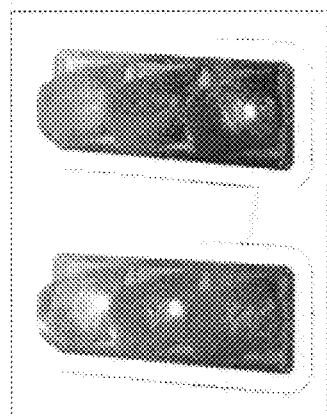
FIG. 4: shows a schematic representation of an image of an overhead traffic light according to another exemplary embodiment of the present invention.

FIG. 4 shows a schematic representation of an image of an overhead traffic light according to another exemplary embodiment of the present invention.

FIG. 4 shows an exemplary embodiment with difficult conditions for detecting the traffic light phase. The left traffic light shows the highest average for the red signal lamp and the lowest average for the green signal lamp. During the formation of a maximum value it is shown that red and amber have a comparable brightness and color saturation. The traffic light is therefore showing amber-red.

As is clear from FIG. 4, an averaging for the amber signal lamp for the right traffic light would result in significantly lower values than the approximately identical averages for the red and the green signal lamp. However, the traffic light recognition does not have to make a decision since a red-green traffic light phase does not exist. During formation of a maximum value it is shown that the red signal lamp has a lower maximum brightness or respectively color saturation, compared with the green signal lamp.

In particular, modern signal lamps have beam distributors or respectively free-form reflectors, including stepped reflectors, for LED light sources. In the case of specific, unfavorable high viewing angles, beam distributors only make a small part of the light area appear illuminated and, consequently, the segmented partial region of the signal lamp only partially appears to be illuminated from the high (for example >30° viewing angles, i.e. it is not imaged with full color saturation and full brightness over the entire surface of the signal lamp.

As can likewise be seen from FIG. 4, the maximum brightness or respectively the maximum brightness value is, however, scarcely influenced by the high viewing angle in the region of the respective signal lamp and is approximately equally low for the amber and the red signal light of the right traffic light. The right traffic light is therefore showing green.

This advantageously shows that an image data evaluation on the basis of the maximum color saturation and/or the maximum brightness is less prone to failure with respect to images at different viewing angles and is therefore more reliable overall.

Although the present invention has been described above on the basis of preferred exemplary embodiments, it is not restricted to these, but can be modified in many ways. In particular, the invention can be amended or modified in multiple ways, without deviating from the core of the invention.

In addition, it is pointed out that "comprising" and "having" do not exclude any other elements or steps and "a" or "one" does not exclude a plurality.

It is additionally pointed out that features or steps which have been described with reference to one of the above exemplary embodiments can also be used in combination with other features or steps of other exemplary embodiments described above. Reference numerals in the claims are not to be viewed as restrictions.

The invention claimed is:

1. An apparatus for determining a traffic light phase for a motor vehicle, the apparatus comprising:
   an image sensor device configured to capture a captured image of a traffic light that includes plural signal lamps, and to provide the captured image as image data;
   a segmentation device configured to define plural regions of the captured image and to assign the plural regions respectively individually to the plural signal lamps of the traffic light;
   a scaling device configured to determine a respective maximum color saturation and a respective mean color saturation, and/or to determine a respective maximum brightness and a respective mean brightness, respectively within each one of the plural regions; and
   a computer device configured to determine the traffic light phase of the traffic light based on a comparison of the maximum color saturation to the mean color saturation, and/or a comparison of the maximum brightness to the mean brightness, respectively for each one of the plural regions.

2. The apparatus according to claim 1, wherein the computer device is configured to determine the signal status of the traffic light further based on:
   i) contrast values of the captured image;
   ii) prevailing light conditions; or iii) performance parameters of the image sensor device;
   with aid of:
   (iv-a) the maximum color saturation alone;
   (iv-b) the maximum brightness alone; or
   (iv-c) both the maximum color saturation and the maximum brightness.

3. The apparatus according to claim 1, wherein the scaling device is configured to determine the respective maximum color saturation and the respective maximum brightness respectively in the plural regions based on an evaluation of an HSV color space of the captured image.

4. The apparatus according to claim 1, wherein the segmentation device is configured to assign the plural regions respectively individually to the plural signal lamps of the traffic light based on an optical image recognition of signal lamp covers of the plural signal lamps of the traffic light.

5. The apparatus according to claim 1, wherein the image sensor device comprises a wide-angle lens.

6. The apparatus according to claim 1, wherein the image sensor device has an upwardly pointing viewing direction and is configured to capture the captured image of the traffic light which is an overhead traffic light.

7. A motor vehicle comprising a vehicle body and an apparatus according to claim 1.

8. A method of determining a traffic light phase for a motor vehicle, the method comprising the following method steps:
   capturing a captured image of a traffic light that includes plural signal lamps, by an image sensor device and providing the captured image as image data;
   defining plural regions of the captured image by a segmentation device, and assigning the plural regions respectively individually to the plural signal lamps of the traffic light by the segmentation device;
   determining a respective maximum color saturation and a respective mean color saturation and/or determining a respective maximum brightness and a respective mean brightness, respectively within each one of the plural regions by a scaling device; and
   determining the traffic light phase of the traffic light based on a comparison of the maximum color saturation to the mean color saturation, and/or a comparison of the maximum brightness to the mean brightness, respectively for each one of the plural regions by a computer device.

9. The method according to claim 8, wherein the determining of the respective maximum color saturation and/or the determining of the respective maximum brightness comprises determining, within each respective one of the plural regions, a respective subregion having a highest value of color saturation and/or having a highest value of brightness within the respective region.

10. The method according to claim 9, wherein the subregion consists of a single pixel of the captured image.

11. The method according to claim 9, wherein the subregion consists of a few contiguous pixels of the captured image.

12. The method according to claim 8, wherein:
   the comparison of the maximum color saturation to the mean color saturation comprises forming a color saturation ratio of the maximum color saturation relative to the mean color saturation, and/or the comparison of the maximum brightness to the mean brightness comprises forming a brightness ratio of the maximum brightness relative to the mean brightness, respectively for each one of the plural regions; and
   the determining of the traffic light phase comprises determining that a particular one of the signal lamps is illuminated when the one of the plural regions that has been assigned to the particular signal lamp has a highest value of the color saturation ratio and/or a highest value of the brightness ratio among all of the plural regions.

13. The apparatus according to claim 1, wherein the scaling device is configured to determine the respective maximum color saturation and the respective mean color saturation respectively within each one of the plural regions.

14. The apparatus according to claim 1, wherein the scaling device is configured to determine the respective maximum brightness and the respective mean brightness respectively within each one of the plural regions.

15. The apparatus according to claim 1, wherein the scaling device is configured to determine the respective maximum color saturation and/or to determine the respective maximum brightness by determining, within each respective one of the plural regions, a respective subregion having a highest value of color saturation and/or having a highest value of brightness within the respective region.

16. The apparatus according to claim 15, wherein the subregion consists of a single pixel of the captured image.

17. The apparatus according to claim 15, wherein the subregion consists of a few contiguous pixels of the captured image.

18. A method of determining a traffic light phase of a traffic light, comprising:
   a) with an image sensor of a motor vehicle, capturing a captured image of the traffic light which includes plural signal lamps;
   b) with an image processing system, assigning plural image regions of the captured image respectively individually to the plural signal lamps;
   c) with the image processing system, within each respective one of the image regions, determining a respective maximally illuminated subregion that has a respective maximum color saturation and/or a respective maximum brightness compared to a remainder, other than the respective subregion, of the respective one of the image regions; and
   d) with the image processing system, determining the traffic light phase of the traffic light based on evaluation of the respective maximum color saturation and/or the respective maximum brightness determined for the respective maximally illuminated subregion in each one of the plural regions.

19. The method according to claim 18, wherein each one of the maximally illuminated subregions consists of a single pixel or a group of contiguous pixels in an area smaller than the respective region within which the respective maximally illuminated subregion is determined.

* * * * *